W. I. WOLVERTON.
ANIMAL TRAP.
APPLICATION FILED JUNE 9, 1911.
1,024,875.
Patented Apr. 30, 1912.
3 SHEETS—SHEET 1.
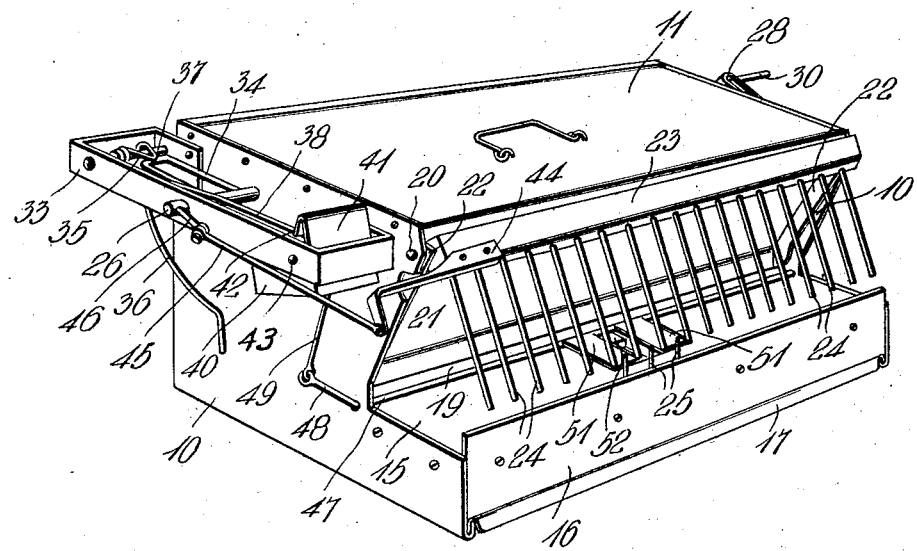
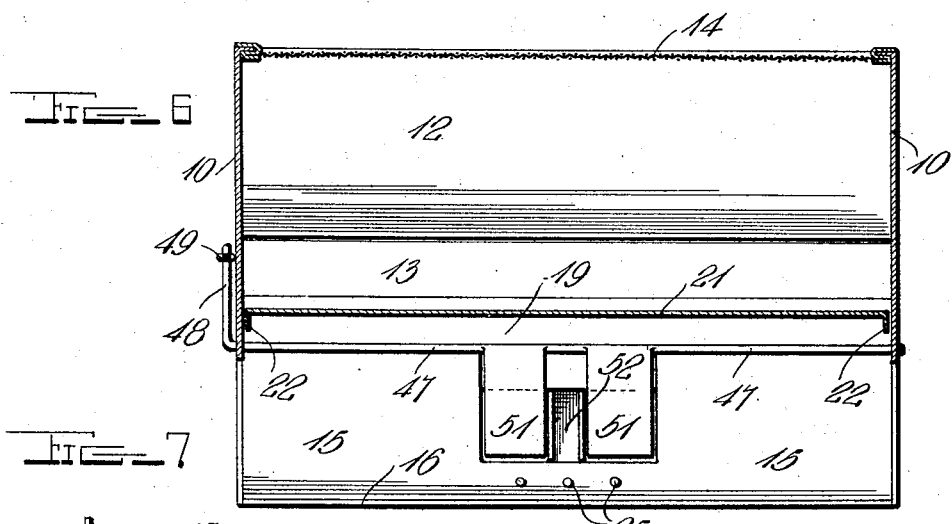
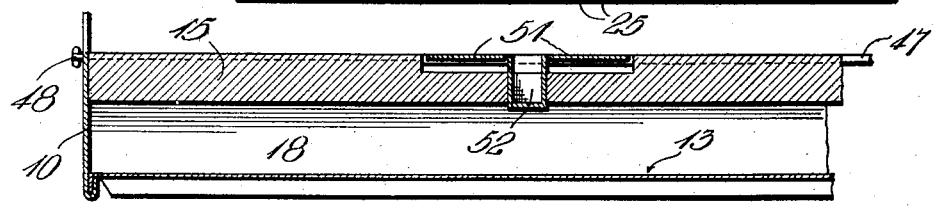
Witnesses
Inventor
Washington I. Wolverton
By William W. Deane
his Attorney W. I. WOLVERTON.
ANIMAL TRAP.
APPLICATION FILED JUNE 9, 1911.
1,024,875.
Patented Apr. 30, 1912.
3 SHEETS—SHEET 2.
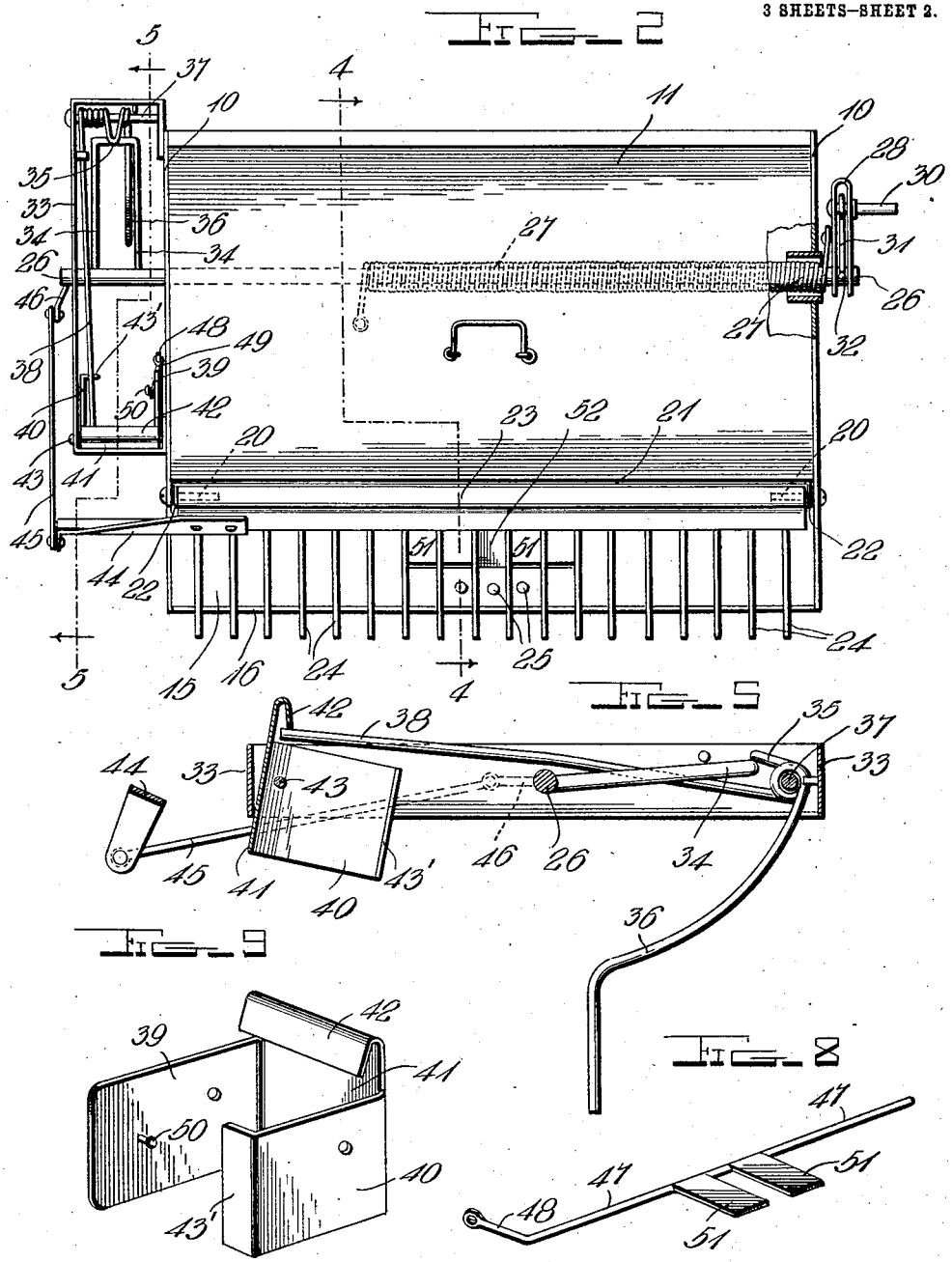

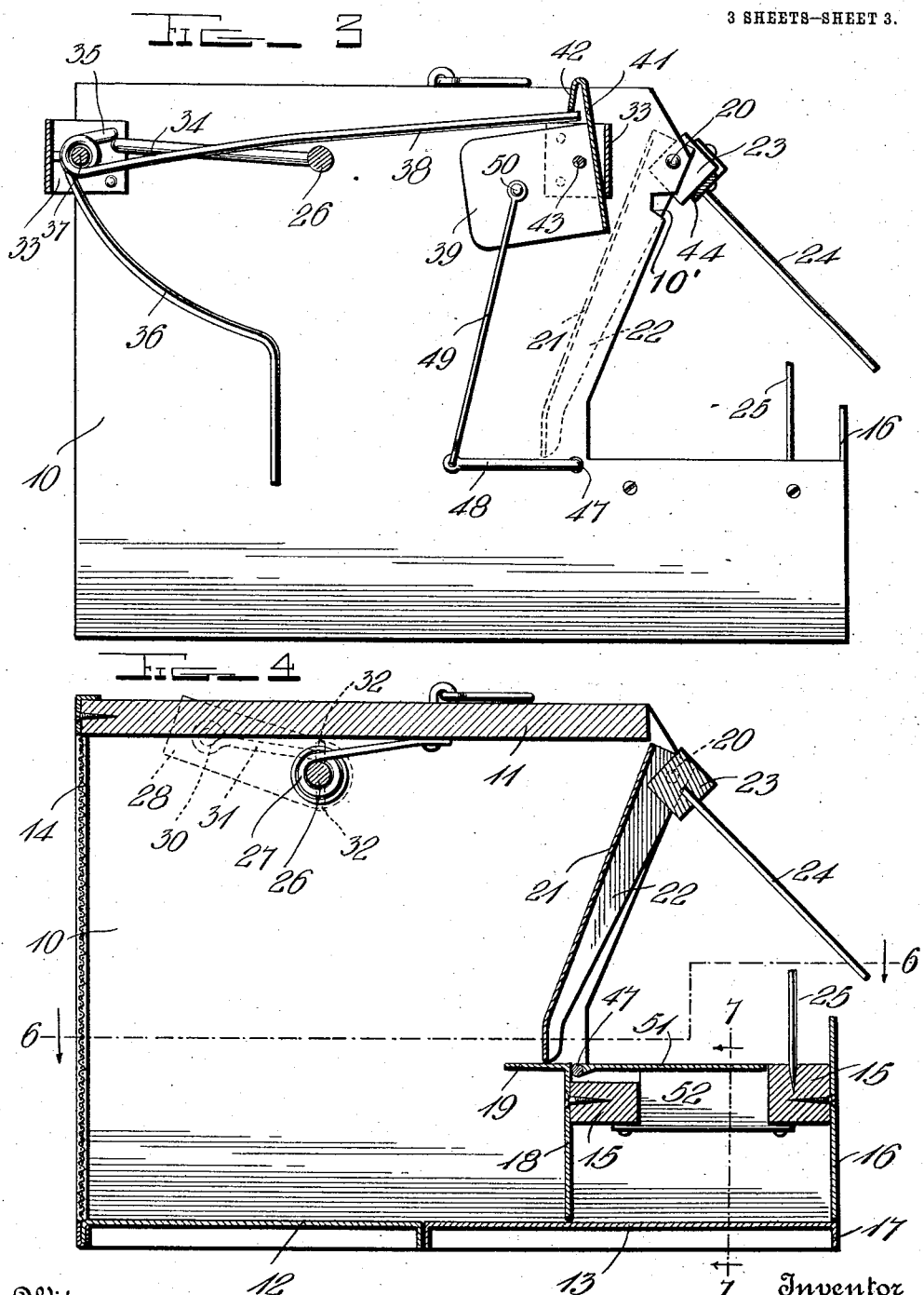

UNITED STATES PATENT OFFICE.

WASHINGTON I. WOLVERTON, OF HOLTON, KANSAS.

ANIMAL-TRAP.

1,024,875.  Specification of Letters Patent.  Patented Apr. 30, 1912.

Application filed June 9, 1911. Serial No. 632,266.

*To all whom it may concern:*

Be it known that I, WASHINGTON I. WOLVERTON, citizen of the United States, residing at Holton, in the county of Jackson and State of Kansas, have invented certain new and useful Improvements in Animal-Traps, of which the following is a specification.

This invention relates to animal traps and has for its primary object to improve generally the construction of the trap shown in my prior Patent No. 902,790, dated November 3, 1908. In that trap, the animals were killed and thrown from the trap, but in the present form of trap, to be presently fully described, the animals are caught alive.

The present invention therefore not only has as its aim to improve upon the former trap in the matter of details of construction, but also to so rearrange the elements of the former trap as to trap the animals alive.

The invention further aims to so construct the entrance or runway of the trap as to prevent the exit of an animal without being trapped. And also to prevent a mouse or other small animal passing around the trigger plates of the trap.

The invention further aims to so construct the trap that the trapped animals may be discharged by sliding out a section of the floor of the trap which may be readily cleaned, as may also the fixed section of the floor.

Other features of the invention will be made apparent as the description thereof progresses, and in the accompanying drawings, Figure 1 is a perspective view of the trap, Fig. 2 is a top plan view thereof, Fig. 3 is a side elevation with parts of the frame broken away, Fig. 4 is a vertical sectional view on the line 4—4 of Fig. 2, Fig. 5 is a similar view on the line 5—5 of Fig. 2, Fig. 6 is a horizontal sectional view on the line 6—6 of Fig. 4, Fig. 7 is a vertical sectional view on the line 7—7 of Fig. 4, Fig. 8 is a detail perspective view of the trigger plates and a portion of the shaft upon which they are mounted, Fig. 9 is a similar view of the detent of the trap mechanism.

In the drawings, the body of the trap is illustrated as embodying sides 10, a top 11, and a bottom which consists of a fixed section 12 and a section 13 which is slidably removable for the purpose of removing the trapped animals. The back of the trap body is of screen mesh as indicated by the numeral 14, and this enables one to ascertain whether or not the trap has been sprung.

The runway of the trap includes a floor 15, and a plate 16 the upper edge portion of which projects upwardly above the floor of the runway. The floor section 13 of the trap body is removable from the front of the trap and is provided at its front with a depending flange 17 which may be grasped for the purpose of the removal of the said floor section and which, when the section is in closed position, lies in a vertical plane with the plate 16. Secured to the rear of the floor 15 of the runway is a plate 18 formed at its upper edge with an inturned flange 19. A shaft 20 is fixed at its ends in the sides of the body of the trap and a door 21 is formed at its side edges with flanges 22 which are pivoted upon the shaft 20. The lower edge of the door 21 rests by gravity against the flange 19 of the plate 18, the door being hingedly supported from the shaft 20. A bar 23 is also pivoted upon the shaft 20 and carries fingers 24 which project downwardly and forwardly when the bar is in normal position. The lower ends of these fingers 24 terminate immediately above the upper edge of the plate 16 and they form one wall of the runway, of which the door 21 forms the other wall the said door and the fingers being in synclinal planes. For a purpose to be presently explained, fingers 25 project upwardly from the floor of the runway of the trap immediately inwardly of the fingers 24.

A shaft 26 is journaled in the sides of the body of the trap and upon the shaft is mounted a spring 27 which at one end is secured to the top 11 of the trap body and at its other end is engaged with a yoke 28 which is rotatably mounted upon one projecting end of the shaft. This yoke carries a handle 30 by means of which it and the shaft 26 may be rotated, and loosely mounted in the yoke is a pawl 31 which coöperates with studs 32 which project radially from the shaft 26 between the arms of the yoke 28. It will be readily understood from the foregoing that the spring 27 is to be placed under tension by the rotation of the handle 30 and that it tends to rotate the shaft backwardly.

A bracket 33 is secured upon that side of the body of the trap opposite the side at which the winding handle 30 is located and the corresponding end of the shaft 26 is journaled in this bracket. Fixed upon the shaft 26 within the bracket 33 is a bail 34 which engages, when the trap is set, with a finger 35 which constitutes an extension of a brake arm 36 mounted to rock upon a short rod 37 fixed in the bracket 33. The arm 36 also has a finger 38 extending therefrom.

For the finger 38, above mentioned, there is provided a detent which is clearly shown in Fig. 9 of the drawings and which is formed from a blank bent to form sides 39 and 40 and a connecting portion 41 which projects above the sides and has its upper portion bent over inwardly as at 42. A pin 43 is fixed in the bracket and the adjacent side of the body of the trap and upon this pin the detent is pivotally mounted in such manner that the sides thereof will normally assume the position shown in Fig. 5 of the drawings. The side 40 of the detent is formed with an inturned flange 43' the purpose of which will be presently explained. It will be noted from Figs. 1 and 5 of the drawings that the end of the finger 38 normally engages with the overturned portion 42 of the detent and this serves to hold the shaft 26 against rotation, through the medium of the finger 35 and bail 34. It will be readily understood, however, that when the detent is rocked so as to disengage the portion 42 thereof from the finger 38, the bail 34 will be released thereby allowing the shaft 26 to rotate. While the first part of the cycle of revolution of the shaft 26 is rapid, the latter part is retarded by the riding of the bail 34 over the brake arm 36. This insures proper reëngagement of the bail with the finger 35. An arm 44 is secured to and projects laterally from the bar 23 at one end thereof, and a rod 45 is pivoted to the end of this arm and to an arm 46 which is fixed upon that end of the shaft 26 opposite the end at which the winding handle 30 is located. It will now be understood that when the shaft 26 rotates, the fingers 24 will be quickly swung in the direction of the pivoted door 21.

One of the sides 10 of the body is provided with a recess 10' which is adapted to receive the inner portion of the arm 44 when the same is swung in a downward direction, thereby limiting the pivotal movement of the bar 23.

A shaft 47 is journaled in the sides of the body of the trap immediately above the floor of the runway and one end of this shaft is provided with a crank arm 48 to which is pivoted the lower end of a rod 49. The upper end of this rod is pivoted to a pin 50 carried by one side of the detent, before described. The shaft 47 carries two trigger plates 51 which straddle a bait holder 52 fixed in the floor of the runway.

It will now be readily understood that when an animal enters the runway and treads upon either of the trigger plates 51, the shaft 47 is rocked thereby releasing the end of the finger 38 from the detent. This results in a release of the bail 34 and in a rotation of the shaft 26. Rotation of the shaft 26 causes the fingers 24 to sweep inwardly toward the door 21 and at the latter part of this movement, the bar, and door are rapidly swung inwardly to permit of the swift passage of the animal into the interior of the trap. It will be further understood that the fingers 25 prevent the passage of mice and other small animals around the trigger plates 51. The flange 43' of the detent engages with the end of the finger 38 as the latter is lowered and this serves to immediately return the detent to normal position aside from its normal tendency to assume such position by gravity.

What is claimed is:

1. In a trap, a compartment, a swinging door normally closing the same, a runway, a bar mounted above the runway, sweep fingers projecting from the bar, a spring impelled shaft, connection between the shaft and the bar, means for normally holding the shaft against rotation, a trigger plate arranged in the runway, and connection between the trigger plate and the said means for releasing the latter when the former is depressed.

2. In a trap, a compartment, a swinging door normally closing the same, a runway, a bar mounted above the runway for rocking movement, a spring actuated shaft, connection between the shaft and the bar, an arm upon the shaft, a latch finger normally engaging the arm to hold the shaft against rotation, a gravity actuated detent, a projection from the latch finger normally engaging the detent, and a trigger plate arranged in the runway and having operative connection with the detent.

3. In a trap, a compartment, a swinging door normally closing the same, a runway, a bar mounted above the runway for rocking movement, a spring actuated shaft, connection between the shaft and the bar, an arm upon the shaft, a latch finger normally engaging the arm to hold the shaft against rotation, a gravity actuated detent, a projection from the latch finger normally engaging the detent, a trigger plate arranged in the runway and having operative connection with the detent, and means upon the detent arranged to engage with the projection of the latch finger whereby to return the detent quickly to normal position after actuation.

In testimony whereof I affix my signature in presence of two witnesses.

WASHINGTON I. WOLVERTON.

Witnesses:
 E. E. McCardle,
 W. H. Webster.

Copies of this patent may be obtained for five cents each, by addressing the "Commissioner of Patents, Washington, D. C."